(12) United States Patent
Lambert

(10) Patent No.: US 8,579,626 B2
(45) Date of Patent: Nov. 12, 2013

(54) NOZZLE FOR A MACHINE FOR MANUFACTURING CONTAINERS

(75) Inventor: Thierry Lambert, Octeville sur Mers (FR)

(73) Assignee: Sidel Participations, Octeville sur Mer (FR)

( * ) Notice: Subject to any disclaimer, the term of this patent is extended or adjusted under 35 U.S.C. 154(b) by 144 days.

(21) Appl. No.: 13/265,259

(22) PCT Filed: Apr. 14, 2010

(86) PCT No.: PCT/FR2010/000306
§ 371 (c)(1),
(2), (4) Date: Dec. 14, 2011

(87) PCT Pub. No.: WO2010/122237
PCT Pub. Date: Oct. 28, 2010

(65) Prior Publication Data
US 2012/0114783 A1    May 10, 2012

(30) Foreign Application Priority Data
Apr. 21, 2009 (FR) ..................................... 09 01916

(51) Int. Cl.
*B29C 49/58* (2006.01)
(52) U.S. Cl.
USPC .......................................................... 425/535

(58) Field of Classification Search
USPC .................................................. 425/529, 535
See application file for complete search history.

(56) References Cited

U.S. PATENT DOCUMENTS

| 4,552,527 A * | 11/1985 | Hunter .......................... 425/535 |
| 2003/0077349 A1 | 4/2003 | Derouault et al. |
| 2010/0143531 A1 | 6/2010 | Derrier et al. |
| 2010/0176540 A1 | 7/2010 | Sperka et al. |

FOREIGN PATENT DOCUMENTS

| FR | 2 912 678 A1 | 8/2008 |
| FR | 2 804 059 A1 | 7/2011 |
| WO | 2009/007315 A2 | 1/2009 |

* cited by examiner

*Primary Examiner* — Robert B Davis
(74) *Attorney, Agent, or Firm* — Sughrue Mion, PLLC

(57) ABSTRACT

Pressurized gas injecting device (14) for a machine (1) for blow molding or stretch blow molding a container from a blank (2) of plastic material. The device has a nozzle (15) movable between an upper position separated from a mold (9) intended to receive the blank (2) and a lower position pressed against the mold (9) while covering a neck (3) of the blank (2); an insert (36) mounted movably with respect to the nozzle (15), the insert (36) having a lower end face (45) capable of being pressed against a lip (4) of the blank (2); and a return device (44) applying force on the insert (36) toward a lower position in which the insert (36) is at the end-of-travel stop with respect to the nozzle (15), and in which the lower end face (45) of the insert (36) extends beyond the nozzle (15).

10 Claims, 2 Drawing Sheets

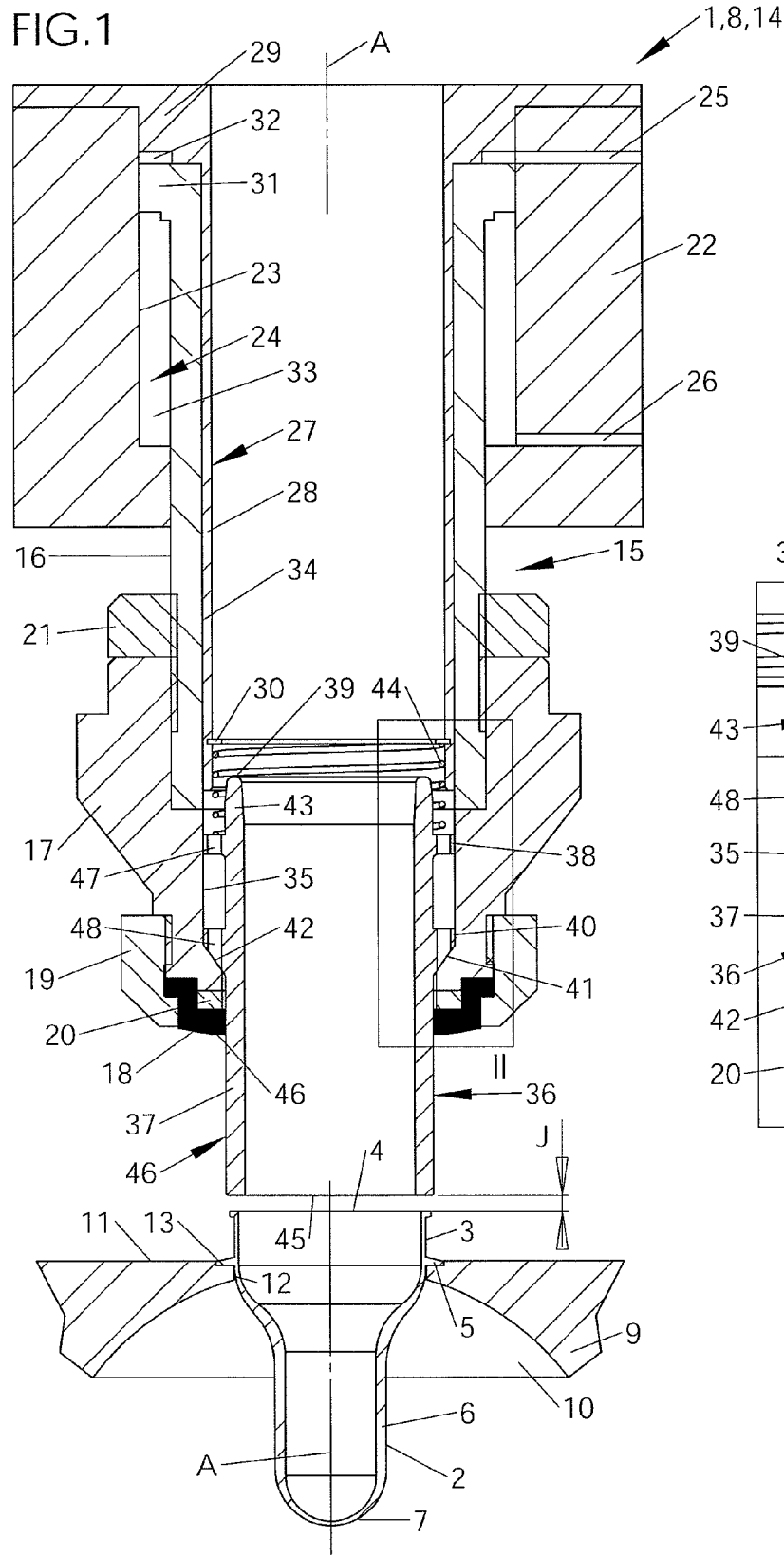

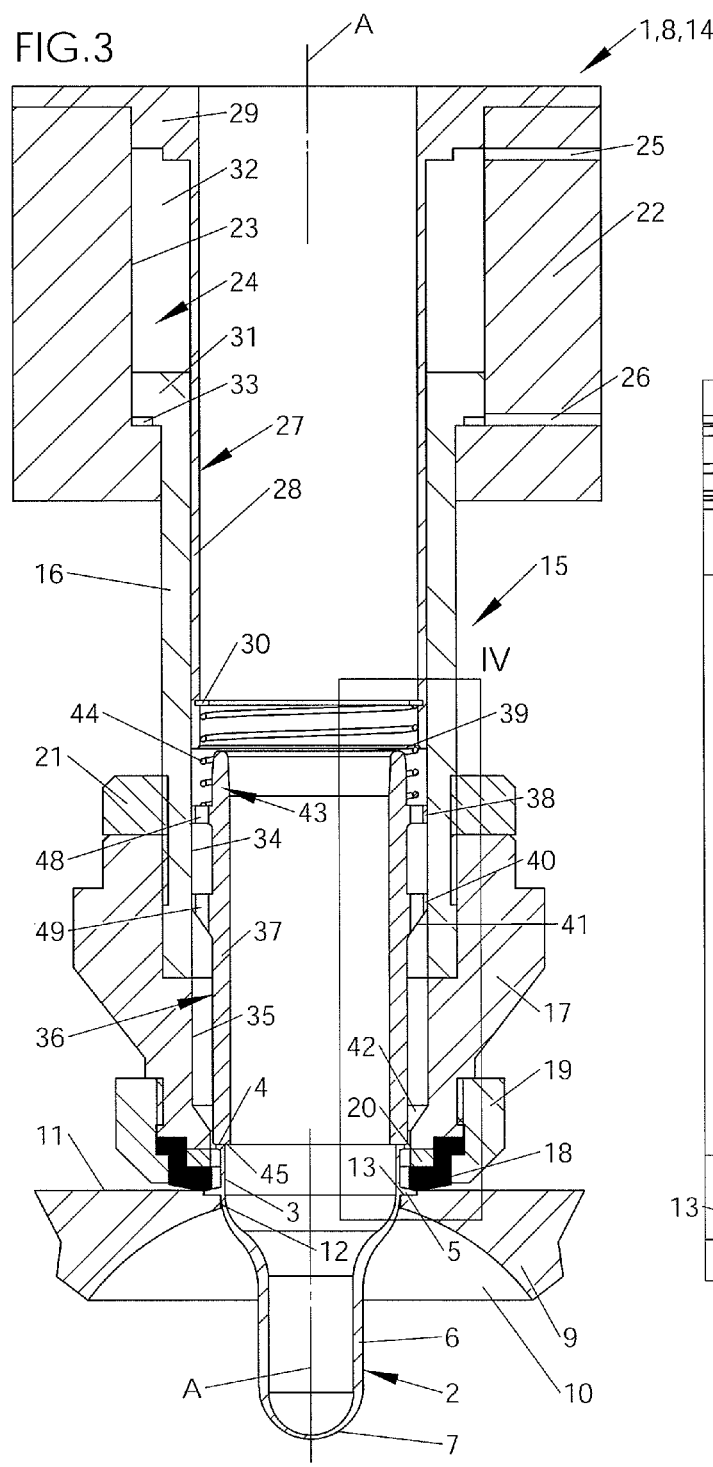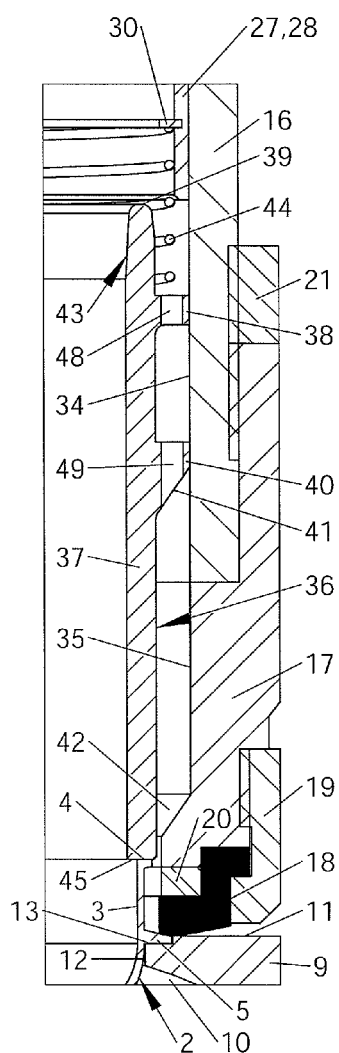

NOZZLE FOR A MACHINE FOR MANUFACTURING CONTAINERS

CROSS REFERENCE TO RELATED APPLICATION

This application is a National Stage of International Application No. PCT/FR2010/000306 filed Apr. 14, 2010, claiming priority based on French Patent Application No. 0901916 filed Apr. 21, 2009, the contents of all of which are Incorporated herein reference.

The invention relates to the field of the manufacture of containers, by blow molding or stretch blow molding.

The blow molding of containers usually takes place in a mold one wall of which defines a cavity corresponding to the impression of a container, into which is inserted a blank of plastic material previously heated to soften the material (the term "blank" is not only a preform, but also an intermediate container having previously undergone one or more blow moldings), said blank being then pressurized to press it against the mold wall and thus form the container.

The introduction of a gas (typically air) in the blank is done through a nozzle applied tightly against an upper surface of the mold. Due to its hollow form, the nozzle, which covers the neck of the blank protruding from the mold, is generally called a "bell nozzle".

Such a nozzle is described in French patent application No. FR 2 849 905 or the equivalent US patent application No. US 2006/0115546, both in the name of the applicant.

If the preform is improperly positioned when the nozzle is placed on the mold, the preform retains its improper position during blow molding, which results in a malformed container the neck of which, visually unsightly, makes it unsuitable for filling and capping.

This is the reason this nozzle has been improved by the addition of a system for stabilizing the preform, comprising a movable insert that is applied against the neck of the preform to press it against the mold and restore it, if necessary, to the vertical position prior to the commencement of blow molding.

This system, described in French patent application No. FR 2 912 687 in the name of the applicant, has made it possible to significantly reduce the rejection rate of containers.

However, although they are less numerous than before and in spite of everything, incidents are still reported. These incidents involved in particular (but not exclusively) the blow molding of small capacity containers (particularly 0.5 L), the preforms of which have a short body which increases the risk of offset during insertion into the mold. In fact, some preforms have such an offset that when the nozzle descends, the neck is crushed by it even before the preform can be stabilized.

Furthermore, known from patent application FR 2 805 059 and its American equivalent US 2003/077349 in the name of the applicant, is a nozzle equipped with a gripping device which, during the lowering of the nozzle, is forcibly fitted into the neck. The problem disclosed in this document, however, is quite different, since it involves angularly orienting the blank precisely around its axis. In fact, the gripping device is not designed to stabilize the blank in the event of improper axial positioning. On the contrary, the proper operation of the system assumes a correct axial positioning of the blank to begin with, failing which the gripping device can, by pressing unsymmetrically on the blank, aggravate its improper positioning.

The invention seeks to increase the reliability of blow molding (and thus the average quality of the containers) by making improvements to the known nozzles, and more specifically by improving the stabilization of the preforms at the beginning of the blow molding.

To that end, the invention proposes, according to a first aspect, a pressurized gas injecting device for a machine for blow molding or stretch blow molding a container from a blank of plastic material, said device comprising:
- a nozzle movable in translation between an upper position in which it is separated from a mold intended to receive the blank, and a lower position in which it is pressed against the mold while covering a neck of the blank,
- an insert mounted movably in translation with respect to the nozzle, said insert having a lower end face capable of being pressed against a lip of the blank;
- a return device applying force on the insert toward a lower position in which the insert is at the end-of-travel stop with respect to the nozzle, and in which the lower end face of the insert extends beyond the nozzle.

In this way, it is possible to minimize the clearance between the insert and the neck of the preform during the insertion thereof into the mold. The result is a more immediate stabilization of the preform, which minimizes the risks of improper positioning during the blow molding.

Said support face is preferably flat, and perpendicular to the axis of movement of the insert.

According to a preferred embodiment, the thickness of the insert at the lower end face is greater than that of the neck of the blank at the lip.

The insert comprises, for example, a tubular body from which at least one collar extends in radial projection, said collar slidably cooperating with a bore made in the nozzle, said collar possibly having holes forming vents.

According to a preferred embodiment, the nozzle is mounted in translation with respect to a fixed cylinder; the return device (in practice, a compression spring) is preferably placed between the insert and a support surface fixed with respect to the cylinder; said support surface pertains for example to a ring mounted on a sleeve fixed with respect to the cylinder and a body of which is fitted into the nozzle.

According to a second aspect, the invention proposes a machine for manufacturing containers by blow molding or stretch blow molding from blanks of plastic material, which comprises:
- at least one molding unit equipped with a mold intended to receive a blank, and
- a nozzle such as was described above, said nozzle being movably mounted between an upper position where it is separated from the upper face of the mold in order to allow the insertion of the blank into the mold, and a lower position in which it is pressed against the upper face of the mold.

Other objects and advantages of the invention will be seen from the following description with reference to the appended drawings in which:

FIG. 1 is a cross-sectional elevation view of the nozzle, shown in a raised position, placed directly above a preform inserted in a mold;

FIG. 2 shows in large scale a detail view of FIG. 1 at insert II,

FIG. 3 is a figure similar to FIG. 1, showing the nozzle in the lowered position applied against the mold;

FIG. 4 is a large-scale detail view of FIG. 3 at insert IV.

Partially represented in FIG. 1 is a machine 1 for manufacturing containers by blow molding or stretch blow molding blanks 2 of plastic material such as PET. Although it can also involve an intermediate container having undergone at least one prior blow molding operation, we assume in the following that the blank 2 in this instance is a preform having undergone only one heating operation at a temperature above its glass transition temperature.

The preform 2 comprises a neck 3, which remains substantially unchanged during the blow molding and has set one upper end a lip 4 that is circular in shape. The neck 3 extends below a collar 5 allowing the preform 2 to be held during the manufacturing steps (heating, blow molding) of the container, by a substantially cylindrical body 6 closed at one lower end by a hemispheric cap 7.

Machine 1 comprises a plurality of molding units 8, only one of which is represented in the figures. Said unit 8 comprises a hollow mold 9 with a cavity 10 defining the impression of the container. The cavity 10 has a general symmetry of revolution around an axis A. Said axis of symmetry is common to all of the elements that will be described below. At an upper end, the mold 9 has an upper face 11 into which the cavity 10 opens through an circular opening 12 through which the preform 2 is inserted into the mold 9.

As can be seen particularly in FIG. 1, the opening is provided with a counterbore 13 into which the collar 5 of the preform 2 is fitted when it is normally inserted into the mold 9.

The preform 2 illustrated in FIG. 1 is a preform intended for the manufacture of a container of small capacity, such as 0.5 L, which explains its compact shape, the body 6 being short in length and with a diameter less than that of the neck 3. Although the invention is in no way related to the shape or size of the preforms, a preform 2 of this type has been deliberately represented, because it is statistically subject—more so than preforms of containers of larger capacity (1.5 L or 2 m)—to being offset during its insertion into the mold. Such offset is generally due to elastic shock of the collar 5 against the counterbore 13 during the insertion of the preform 2 into the mold.

The molding unit 8 is equipped with a gas injection device 14 including a bell nozzle 15. The nozzle 15 comprises:
 a tubular nozzle body 16 which, when the manufacture of the container includes a stretching operation, is traversed by a slidable stretch rod (not shown);
 a threaded end fitting 17, screwed onto the nozzle body 16 at a lower end thereof;
 an annular fluid seal 18 (made of a flexible material such as rubber—natural or synthetic—or silicone) with a central hole made in it, secured by a collar at 19 screwed onto the end fitting 17, with a washer 20 inserted between the seal 18 and the end fitting 17 for purposes of rigidity;
 a lock nut 21 screwed onto the nozzle body 16 above the end fitting 17 and tightened against it to prevent it from unscrewing.

The nozzle 15 is mounted movable in translation, in the axis A of the mold 9, between an upper position (FIG. 1) in which it is separated from the upper face 11 of the mold 9 in order to allow the preform 2 to be inserted therein, and a lower position (FIG. 3) in which it is applied against the upper face 11, the inner edge of the seal 18 pressing against the collar 5.

The injection device 14 comprises a cylinder 22 with respect to which the nozzle 15 is mounted in translation. The cylinder 22, which supports and guides the nozzle 15 during its movement, comprises a central bore 23 defining an internal volume 24 to which two superimposed channels lead that are made in the cylinder wall, i.e. an upper channel 25 and a lower channel 26, to feed a pressurized fluid (such as water or oil, or even air) into the volume 24.

The injection device 14 further comprises a tubular sleeve 27 comprising a body 28 fitted into the nozzle body 16, extended at one upper end by an annular head 29 by which the sleeve 27 is rigidly attached to the cylinder 22.

At a lower end, the sleeve body 28 is provided with an annular inner groove into which is mounted a retainer ring or circlips 30, the function of which will be explained below.

At an upper end, the nozzle body 16 is extended by a head 31 shaped like an annular piston. The piston 31 is received into the bore 23, where it separates the internal volume 24 into two different chambers, i.e. an upper chamber 32 communicating with the upper channel 24, and a lower chamber 33 communicating with the lower channel 26.

The nozzle 15 is moved from its upper position (FIG. 1) to its lower position (FIG. 3) by injection of pressurized fluid into the upper chamber 32 via the upper channel 25 and simultaneous evacuation of the fluid present in the lower chamber 33 via the lower channel 26. Conversely, the nozzle 15 is moved from its lower position to its upper position by injection of pressurized fluid into the lower chamber 33 via the lower channel 26 and the simultaneous evacuation of the fluid present in the upper chamber 32 via the upper channel 25.

As can be seen in the figures, the nozzle body 16 defines internally a bore 34 the diameter of which corresponds, within clearance, with the outside diameter of the sleeve body 28. The end fitting 17 has a middle portion extending the nozzle body 16 at the lower end thereof and internally defining a bore 35 the diameter of which is equal to the diameter of the bore 34, so that there is no discontinuity of diameter at the junction between the nozzle body 16 and the end fitting 17.

The injection device 14 further comprises an insert 36 movably mounted in translation, coaxially, with respect to the nozzle 15. Said insert 36 comprises a tubular body 37 the outside diameter of which is smaller than the inside diameter of the central hole of the seal 18, so as to allow a sliding of the insert 36 without friction at the lower end of the nozzle 15, in particular at the seal 18. The insert 36 is hollow to allow the passage of the stretch rod; its inside diameter is sufficiently large to accommodate, around the stretch rod, a passage for the pressurized gas injected into the preform 2 via the nozzle 15.

The insert 36 is equipped with guide means in the form of at least one collar, and preferably, as shown in the figures, two annular collars projecting from the outer surface of the body 37, i.e. an upper collar 38 located at a predetermined distance, relatively small with respect to the total height of the body 37, from an upper end 39 of the insert 36, and a lower collar 40 separated from the upper collar 38 and located at about midheight of the body 37.

The collars 38, 40 both have an outside diameter, within clearance, equal to the diameter of the bores 34, 35, thus allowing the precise axial guiding of the insert 36 with respect to the nozzle 15.

As can be clearly seen in FIG. 2, the lower collar 40 has a lower support face 41 in the shape of a truncated cone, suitable, in a lower position of the insert 36 illustrated in FIG. 1, to abut against a complementary truncated cone shaped seat 42 formed in the end fitting 17 near the lower end thereof, thus limiting the vertical travel of the insert 36.

Between the upper collar 38 and the upper end 39 of the body 37, the body has an upper end section onto which is fitted a return spring 44, which is also fitted into a lower end section of the sleeve 27 demarcated by the circlips 30. The spring 44, which operates under compression, is inserted in compressed form between the upper collar 38 and the circlips 30 a lower face of which forms a support surface for the spring 44. The spring 44 continuously presses the insert 36 toward its lower position.

The body 37 of the insert 36 has a lower end 45 forming a support face suitable for coming into contact with the lip 4 of the preform 2, as illustrated in FIG. 3, in order to stabilize said preform during the lowering of the nozzle 15 to its lower position. According to an embodiment illustrated in the figures, the support face 45 is flat and extends in a plane perpendicular to the axis A.

As can be clearly seen in FIG. 4, the support face 45 has a median diameter substantially equal to the median diameter of the lip 4 while having a radial extension greater than that of the lip 4 (in other words, the thickness of the body 37 at the support face 45 is greater than the thickness of the neck 3 at the lip 4), so that a slight radial displacement of the preform 2 in the opening 12 is allowed without risk of loss of contact between the support face 45 and the lip 4.

As illustrated in FIG. 1, in the upper position of the nozzle 15 and in the absence of any applied force outside of the insert (other than the force of the return spring 44), the support face 45 extends beyond the nozzle 15. More specifically, in this position where the lower support face 41 of the lower collar 40 abuts against the seat 42, a substantial portion 46 of the body 37 (of a length of more than approximately ⅕ of the total length thereof) extends from the nozzle toward the mold 9 projecting from a support face 47 of the seal 18. In this instance, the body 37 extends from the nozzle 15 by more than one third of its height.

Because of its radial size in its lower part, it is not possible to move the nozzle 15, in its upper position, from the upper face 11 of the mold beyond a minimum safe distance, without it being necessary to reconsider the shape or arrangement of the surrounding components (particularly the components for gripping the preform 2 and the final container).

However, the insert 36, the body 37 of which has an outside diameter substantially equal to or slightly greater than that of the preform 2, can be positioned as close as possible thereto. It is therefore possible to minimize the distance separating the support face 45 from the lip 4, without modifying the distance separating the nozzle 15 from the mold 9 in the upper position of the nozzle 15—i.e., more specifically, the distance between the support face 47 of the seal 18 and the upper face 11 of the mold 9.

Thus, it can be seen in FIG. 1 that the portion 46 of the body 37 nearly fills the space separating the nozzle 15 from the preform 2, although a clearance J is provided between the support face 45 and the lip 4. This clearance J, of just a few millimeters, allows the passage of the preform 2 during its transverse insertion into the open mold 9 (the preform 2 then being slightly raised with respect to its final position in the mold 9, in order to avoid shocks of the collar 5 on the upper face 11 of the mold 9), while preventing the swinging of the preform 2 during the withdrawal of the gripping device when the preform is placed in the mold 9. The angular offset of the preform 2 is counteracted by the abutment of the lip 4 against the support face 45 of the insert 36, which thus tends to return the preform 2 to the vertical position in the axis A of the mold 9.

Furthermore, while in the application FR 912 678 the insert is fully associated with the nozzle, it's return spring being supported against a washer rigidly fixed to the nozzle so that the insert accompanies the nozzle in all of its vertical translation movements, here the insert 36 is partially dissociated from the nozzle 15, it's return spring 44 being supported against the circlips 30, which is mounted in the sleeve 27 which remains fixed during the translation movements of the nozzle 15. It is therefore possible to obtain a predetermined fixed support force of the insert 36 on the preform 2, depending on the initial choice of the spring 44 but independent of the position of the nozzle 15.

As is shown in the figures, the outside diameter of the body 37 of the insert 36 is less than the inside diameter of the sleeve 27, so that an annular passage is made between them for the pressurized gas injected during the blow molding of the preform 2. Axial holes 48, 49 forming vents are also made in the upper collar 38 as well as the lower collar 40, to allow the passage of the gas in the annular space between the body 37 and the nozzle 15 and thus allow the equalization of pressures inside and outside the insert 15 in order to avoid any deformation thereof. In the lower position of the nozzle 15, the seal 18 ensures the seal of the connection with the mold 9, thus limiting gas leaks.

A result of the preceding description is that, by its design, the insert 36 can equip an existing nozzle 15 with a minimum of structural modifications made thereto. The end fitting 17 is practically the only part concerned, with the need to form the truncated cone shaped seat 42 at a height such that at the approach of the nozzle 15 to its upper position it can pick up the insert 36 as it rises, the support face 41 of the lower collar 40 abutting against the seat 42.

The operation of the injection device 14 is as follows, starting from the upper position of the nozzle 15.

In this position, the lower chamber 33 is under pressure, the piston 31 being abutted against the head 29 of the sleeve 27; the nozzle 15 is separated from the mold 9; the lower collar 40 is at the end-of-travel stop against the seat 42, the nozzle 15 thus blocking in translation the insert 36 in the lower position and its suspension at a sufficient distance from the mold 9 to allow the insertion of the preform 2 without blocking the transverse passage of the neck 3.

The mold 9 is opened; the preform 2 is inserted transversely therein by means of a gripping device such as a tongs. The preform 2 is released as the mold 9 is closed. Any improper axial positioning resulting for example from an elastic shock with rebound of the collar 5 against the counterbore 13, is counteracted by the presence near the insert 36 the support face 45 of which is at a short distance J from the lip 4.

Upon the release of the preform 2, the nozzle 15 is moved toward the lower position by means of pressurizing the upper chamber 32 and the simultaneous evacuation of the gas from the lower chamber 33, which causes the vertical movement of the piston 31.

Because the clearance J is small, even negligible, with respect to the travel of the nozzle 15, the insert 36 comes in contact with the lip as soon as the nozzle 15 begins its descent.

In the event the preform 2 bounces on the mold 9 when it is released, its lip 4 hits the support face 45 of the insert. Part of the energy from the shock is absorbed by the compression of the spring 44 and the simultaneous recoil of the insert 36, which thus acts as a shock absorber with respect to the preform 2. The triggering of the spring 44, which occurs a fraction of a second after the shock, presses the preform 2 against the upper face 11 of the mold 9 with the collar 5 fitted into the counterbore 13, while the nozzle 14 continues its descent.

As soon as the seat 42 is separated from the lower collar 40, the support force of the insert 15 on the preform 2 remains constant, equal to the return force exerted by the spring 44 on the insert 36, irrespective of the position of the nozzle 15. The preform 2 is thus pressed against the upper face 11 of the mold 9 and more specifically against the counterbore 13, which holds the preform 2 in the vertical axis A of the mold 9.

In the lower position (FIG. 3), the seal 18 is in contact with the collar 5, thus sealing the internal volume under pressure of the nozzle 15.

The injection device 14 that has just been described makes it possible to reduce the proportion of preforms that are improperly positioned during their insertion into the mold. The result is an additional reduction of the rejection rate and an improvement in the average quality of the blown containers, in particular containers of small capacity.

The invention claimed is:

1. Pressurized gas injecting device (14) for a machine (1) for blow molding or stretch blow molding a container from a blank (2) of plastic material, said device comprising:
    a nozzle (15) movable in translation between an upper position in which it is separated from a mold (9) intended to receive the blank (2), and a lower position in which it is pressed against the mold (9) while covering a neck (3) of the blank (2),
    an insert (36) mounted movably in translation with respect to the nozzle (15), said insert (36) having a lower end face (45) capable of being pressed against a lip (4) of the blank (2);
    a return device (44) applying force on the insert (36) toward a lower position in which the insert (36) is at the end-of-travel stop with respect to the nozzle (15),
    wherein, in the lower position of the insert (36), its end face (45) extends beyond the nozzle (15).

2. Device (14) according to claim 1, characterized in that said support face (45) is flat.

3. Device (14) according to claim 2, characterized in that said support face (45) is perpendicular to an axis (A) of movement of the insert (36).

4. Device (14) according to claim 1, characterized in that the thickness of the insert (36) at the lower end face (45) is greater than that of the neck (3) of the blank (2) at the lip (4).

5. Device (14) according to claim 1, characterized in that the insert (3) comprises a tubular body (37) from which at least one collar (38, 40) extends in radial projection, slidably cooperating with a bore (34, 35) formed in the nozzle (15).

6. Device (14) according to claim 5, characterized in that said collar (38, 40) has holes (48, 49) that form vents.

7. Device (14) according to claim 1, characterized in that the nozzle (15) is mounted in translation with respect to a fixed cylinder (22).

8. Device (14) according to claim 7, characterized in that the return device (44) is inserted between insert (36) and a support surface that is fixed with respect to the cylinder (22).

9. Device (14) according to claim 8, characterized in that said support surface pertains to a retaining ring (30) mounted on a sleeve (27) fixed with respect to the cylinder (22) and a body (28) of which is fitted into the nozzle (15).

10. Machine (1) for manufacturing containers by blow molding or stretch blow molding from blanks (2) of plastic material, which comprises:
    least one molding unit (8) equipped with a mold (9) intended to receive a blank (2), and
    a nozzle (15) according to claim 1, mounted movably between an upper position where it is separated from an upper face (11) of the mold (9) in order to allow the insertion of the blank (2) into the mold (9), and a lower position in which it is pressed against the upper face (11) of the mold (9).

* * * * *